UNITED STATES PATENT OFFICE.

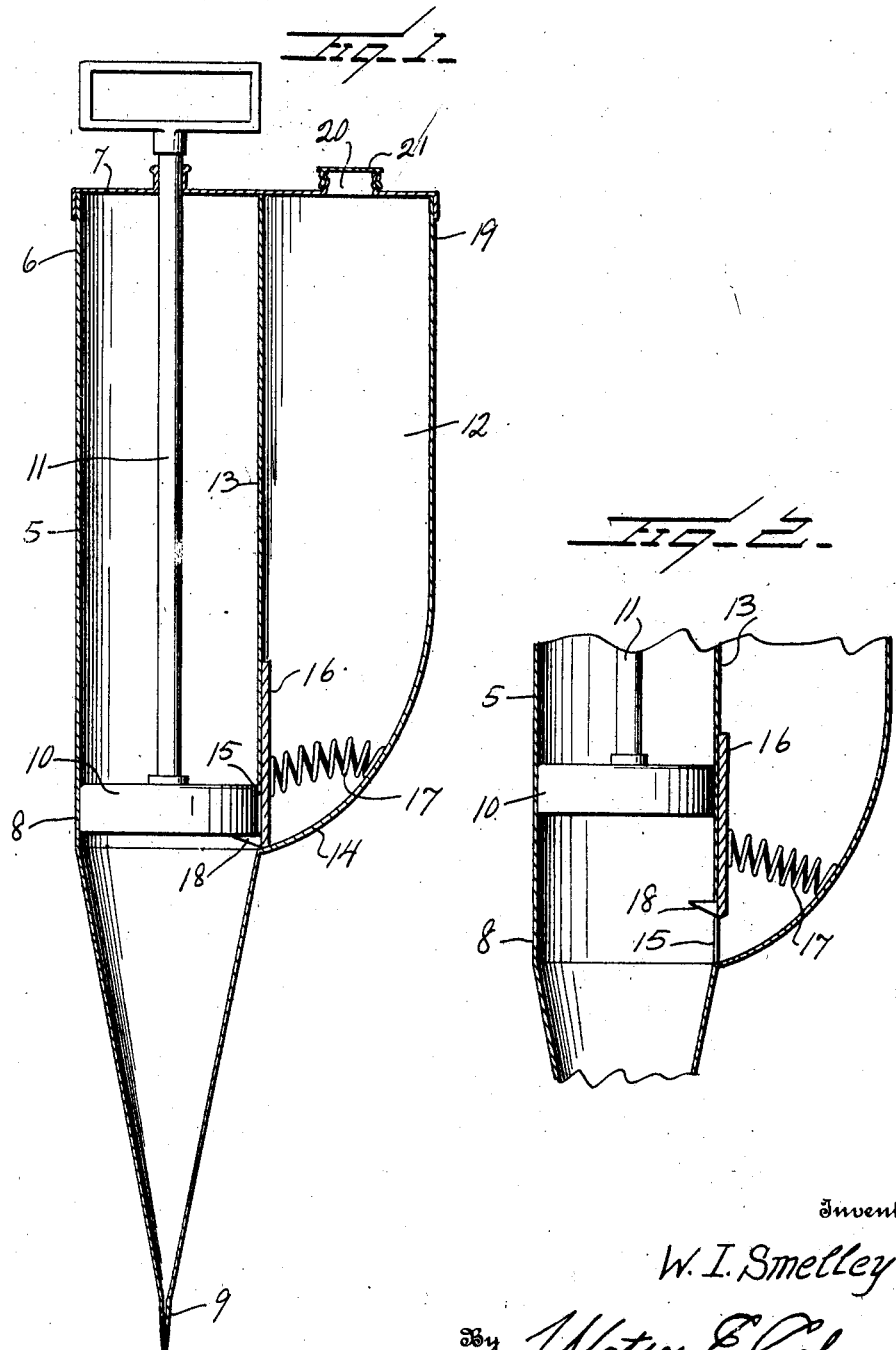

WILLIAM I. SMELLEY, OF DEMOREST, GEORGIA.

INJECTION-PUMP.

1,378,571.　　　　Specification of Letters Patent.　　Patented May 17, 1921.

Application filed June 16, 1920. Serial No. 389,402.

*To all whom it may concern:*

Be it known that I, WILLIAM I. SMELLEY, a citizen of the United States, residing at Demorest, in the county of Habersham and State of Georgia, have invented certain new and useful Improvements in Injection-Pumps, of which the following is a specification, reference being had to the accompanying drawings.

This invention relates to pumps and has for its object to provide a device of this character whereby poison may be injected into a plant for killing insects and like destructive agencies.

Another object of the invention is to provide a pump of this character including a reservoir in which the poison liquid is stored, the valve on the reservoir being moved to its closed position by means of the plunger in the pump.

A still further object of the invention is to provide a pump of this character including a casing adapted to receive a plunger, the end of the casing being tapered to a needle point through which the liquid is discharged.

A still further object of the invention is to provide a pump of this character including a reservoir, said reservoir having a valve plate to control the outlet thereof, said valve plate being held in water-tight engagement with the wall of the reservoir over the outlet and automatically open by means of a spring.

With these and other objects in view, the invention consists in the improved construction and arrangement of parts to be hereinafter more particularly described, fully claimed and illustrated in the accompanying drawings, in which:—

Figure 1 is a longitudinal sectional view showing the valve plate in its closed position, and Fig. 2 is a fragmentary sectional view showing the valve plate in its open position.

Referring to the drawings, 5 designates a casing having closed ends, the end 6 being provided with a cover 7 having a central opening, while the end 8 is formed into a cone, the apex of the cone tapering to a needle point 9, said point including a passage which communicates with the casing through the end 8. Slidably disposed within the casing is a plunger 10 having a plunger rod 11 which extends through the central opening of the cover 7 on the end of the casing, movement of the plunger toward the needle point 9 being limited by contact with the base of the cone.

In order to supply liquid to the pump, a reservoir 12 is provided, said reservoir being attached or formed integral with the casing, the portion 13 of the side wall of the casing forming one wall of the reservoir. The reservoir has a sloping bottom 14 which extends toward the casing and thereby permits all of the liquid within the reservoir to be used, and an outlet opening 15 which is formed in the portion 13 of the casing.

The flow of liquid through the opening 15 is controlled by means of a valve plate 16, the side walls of the reservoir forming guides for said plate. In order to hold the valve plate in liquid-tight engagement with the casing over the opening, a spring 17 is provided. This spring is preferably of the coil type, and is secured at one end to the inclined bottom 14 of the reservoir above or beyond the central portion of the opening 15. The other end of the spring is secured to the valve plate 16. In view of this position, the expansion of the spring forces the plate firmly against the wall portion 13 of the casing at the same time the tendency of the spring to remain in its normal horizontal position causes the plates to be moved upwardly so as to uncover the opening 15 and permit liquid to flow into the casing. The plate 16 is provided with a lug 18 which extends through the opening 15. This lug is directly in the path of the plunger 10. The end 19 of the reservoir is provided with an inlet 20 having a cap 21 through which liquid is supplied to the reservoir.

In operation, the poison liquid within the reservoir 12 is admitted to the casing when the plunger is moved toward the end 6, as the spring is then free to operate and move the valve plate upwardly. When the plunger descends to discharge the liquid through the end 8, the plunger engages the lug 18 and forces the plate 16 over the opening 15 thereby shutting off the supply and at the same time forcing the liquid within the cone out through the needle point 9 into the stalk or roots of the desired plant. The advantage of this method of insect exterminator is that the insect has no chance whatever of escape for the reason that the instant it starts to destroy the plant, it also consumes part of the poison, the poison being of such a nature that while it destroys the insect it does not damage the plant or the product thereof and as the injection is made by means of the needle point the incision is small and not injurious to the plant.

What is claimed is:—

1. A device of the character described comprising a casing having a conical end tapering to a needle point, a plunger in said casing, a reservoir carried by said casing, a portion of the casing forming one wall of the reservoir, said wall having an opening adjacent the conical end, a valve plate slidable within and guided by a portion of the side walls of the reservoir, said reservoir having a bottom sloping toward said opening, a spring carried by said bottom and connected to the valve plate for urging said plate into engagement with the casing, said spring also urging the plate toward one end of the reservoir to uncover the opening therein.

2. A device of the character described comprising a casing having a conical end tapering to a needle point, a plunger in said casing, a reservoir carried by said casing, a portion of the casing forming one wall of the reservoir, said wall having an opening adjacent the conical end, a valve plate slidable within and guided by a portion of the side walls of the reservoir, said reservoir having a bottom sloping toward said opening, a spring carried by said bottom and connected to the valve plate and urging said plate into engagement with the casing, said spring also urging the plate toward one end of the reservoir to uncover the opening therein, and a lug carried by said plate, said lug extending through the opening into the casing in the path of the plunger and adapted to be engaged with said plunger to close the opening against the tension of the spring.

In testimony whereof I hereunto affix my signature.

WILLIAM I. SMELLEY.